US012785287B2

(12) United States Patent
Mora Plaza et al.

(10) Patent No.: US 12,785,287 B2
(45) Date of Patent: Nov. 3, 2026

(54) DEPLOYABLE REFLECTOR

(71) Applicant: Airbus Defence and Space, S.A., Getafe (ES)

(72) Inventors: José Luis Mora Plaza, Getafe (ES); Fernando Cespedosa Castán, Getafe (ES)

(73) Assignee: AIRBUS DEFENCE AND SPACE, S.A., Getafe (ES)

( * ) Notice: Subject to any disclaimer, the term of this patent is extended or adjusted under 35 U.S.C. 154(b) by 19 days.

(21) Appl. No.: 19/038,109

(22) Filed: Jan. 27, 2025

(65) Prior Publication Data

US 2025/0246820 A1 Jul. 31, 2025

(30) Foreign Application Priority Data

Jan. 25, 2024 (EP) .................................... 24382063

(51) Int. Cl.
*H01Q 15/16* (2006.01)
*H01Q 1/10* (2006.01)

(52) U.S. Cl.
CPC ............. *H01Q 15/166* (2013.01); *H01Q 1/10* (2013.01)

(58) Field of Classification Search
CPC ........ H01Q 15/166; H01Q 1/10; H01Q 1/288; H01Q 19/12; H01Q 15/161
See application file for complete search history.

(56) References Cited

U.S. PATENT DOCUMENTS

| | | | | |
|---|---|---|---|---|
| 3,617,113 A | 11/1971 | Hoyer | | |
| 2012/0146873 A1 | 6/2012 | Murphey et al. | | |
| 2022/0359992 A1 | 11/2022 | Plaza Mora et al. | | |
| 2023/0115989 A1 * | 4/2023 | Peterson | H01Q 15/161 | 343/915 |
| 2024/0066828 A1 * | 2/2024 | Kang | B32B 27/18 | |

FOREIGN PATENT DOCUMENTS

| | | | | |
|---|---|---|---|---|
| EP | 2482378 A1 | 8/2012 | | |
| EP | 4160814 A1 | 4/2023 | | |
| WO | WO-2009153454 A2 * | 12/2009 | B64G 1/2224 | |
| WO | 2021058838 A1 | 4/2021 | | |

OTHER PUBLICATIONS

European Search Report from Corresponding European Patent Application No. EP24382063.6, Jun. 28, 2024.

* cited by examiner

*Primary Examiner* — Dieu Hien T Duong
(74) *Attorney, Agent, or Firm* — Workman Nydegger

(57) ABSTRACT

A deployable reflector is configured to transition from a stowed position to a deployed position, passing through various intermediate positions characterized by peaks and valleys, achieving a paraboloid shape when fully deployed. The reflector includes a central polygonal section, which takes the form of an n-sided polygon, and is supported by a set of 2n radial sections. These radial parts extend from the central polygon and widen towards the outer edge. The radial sections are connected by folds that originate from the vertices of the central polygon and extend outward. These folds are arranged so that in the intermediate positions, the valleys alternate with peaks. When the reflector is in its deployed position, the radial sections form a quadratic surface. On the non-reflective side of the radial folds, there are backing elements made from a material that is more elastic than that of the radial parts.

5 Claims, 9 Drawing Sheets

DEPLOYABLE REFLECTOR

FIELD OF THE INVENTION

The present invention relates to a deployable reflector, mainly used in space systems, particularly to a deployable large parabolic reflector. The deployable reflector can be used in large antennas for Earth observation and telecom.

BACKGROUND

There are many deployable reflector assemblies already known in the state of the art.

U.S. Pat. No. 3,617,113 A discloses a deployable reflector assembly comprising a deployable reflector, a series of deployable panels surrounding and operatively connected to said deployable reflector, said series of deployable panels comprising a first deployable array of panels interconnected to form substantially an open cylinder upon deployment and a second deployable array of panels operatively connected to said first deployable array of panels, said second array of panels being interconnected to form a substantially flat ring upon being deployed that lies in a plane that is substantially perpendicular to the central axis of said cylinder formed by said deployed first array of panels and deploying means operatively connected to said series of deployable panels for deploying said series of deployable panels.

WO 2009153454 A2 discloses a hinged folding structure consisting of an assembly of elements hinged together by hinge means, where each of the elements has at each end a hinge enabling it to be connected to the end of another element across a hinge axis (X, Y), all the pivot pins of the hinges being so constructed that the structure can adopt two extreme positions, namely an unfolded position where the elements are more or less continuous with each other to form an ellipse, and a folded position where the elements are brought together and approximately parallel with each other. The elements and the hinges are connected both to means for controlling the unfolding of the elements, and to assistance means for ensuring simultaneity of the unfolding or folding of the elements.

EP 2482378 A1 discloses a deployable antenna which has a larger aperture diameter by four-side links provided in at least three stages and which includes: six deployment link mechanisms arranged radially from a central shaft so as to support an outer edge portion of a flexible reflector mirror surface; and one deployment driving mechanism arranged at a lower portion of a center of arrangement of the six deployment link mechanisms, for unfolding the six deployment link mechanisms. Each of the six deployment link mechanisms includes a first four-side link, a second four-side link, and a third four-side link arranged in an order from a position of the central shaft, around which the six deployment link mechanisms are arranged, toward an outer side of the each of the six deployment link mechanisms so that the each of the six deployment link mechanisms is structured to be foldable in three stages.

WO 2021058838 A1 discloses a deployable assembly for antennas, comprising:—a structure including n pairs of segments, each pair of segments corresponding to one side of a deployed polygonal shape, n hinge joints between the two segments on one side, and n hinged angular links between each two adjacent sides, such that the structure can change from a stowed position with a substantially cylindrical shape into a deployed position with a substantially planar polygonal shape with n sides; and—a reflective surface. According to the invention, the deployable assembly additionally comprises:—a deployable boom between two segments, wherein the deployable boom lays stowed between the two segments before being deployed, the deployable boom ending in a feeder that electromagnetically feeds the antenna and that comprises a clamping element for keeping the structure closed when stowed, such that the feeder plays the role of a structural support element when stowed and an electromagnetic feeder for the antenna when deployed,—a set of tensor elements protruding from the back of the segments, and—a cable network that can shape the reflective surface, such that the corresponding cables are held by the tensor elements.

Currently, large ratio of stowed-to-deployed diameter parabolic reflectors (for instance, more than 1:10) are being required in the space industry. So far very few designs (tensegrity networks, umbrella-like surfaces, etc) are able to deploy successfully such large reflector surfaces in-orbit, implying paramount complexity and cost. Further, these paraboloid reflectors do not fully achieve the target surface accuracy when deployed, as they are composed of ruled surfaces instead of full quadratic ones. Other designs of deployable reflectors can achieve quadratic surfaces when deployed, but typically without large stowed-to-deployed ratios.

Large Space Structures GmbH has developed a deployable reflector for satellites applications where it is difficult to launch a large aperture antenna reflector. This deployable reflector uses the "origami" folding, but incorporating a high amount of nodes and folding lines in its design.

These prior art configurations provide deployable reflectors that are able to work satisfactorily. However, there is a need to have a deployable reflector with a large stowed-to-deployed ratio and a more compact configuration when stowed, a paraboloid surface when deployed and a simpler configuration.

SUMMARY OF THE INVENTION

Thus, it is an object of the invention to provide a deployable reflector for use in space systems that is able to overcome the mentioned drawbacks.

The invention provides a deployable reflector, configured to change from a stowed position to a deployed position with intermediate positions with peaks and valleys, and paraboloid shaped when deployed, that comprises the following parts:

- a central polygonal part, in the form of an n-sided polygon,
- a set of 2n radial parts starting from the central polygonal part and widening towards the periphery, so that the radial parts are joined by radial folds starting from the vertexes of the central polygonal part towards the periphery, the folds being arranged in such a way that the folds which in the intermediate positions are valleys alternate with the folds which in the intermediate positions are peaks, the radial parts having a quadratic surface when the reflector is in its deployed position, and
- backing elements on a non-reflective side of the radial folds in the peak/valley positions, made in a material more elastic than that of the radial parts, wherein the backing elements are configured to allow the folding of the radial parts together when stowed,
- wherein the set of 2n radial parts has a peripheral edge of polygonal shape with n sides, the deployable reflector additionally comprising a frame with n sides attached to the sides of the peripheral edge of the set of 2n radial parts and having a hinged angular link between every two adjacent sides of the frame.

The deployable reflector of the invention has the following advantages:

it allows the deployment of larger aperture reflector antennas from a more compact configuration when stowed.

it achieves higher paraboloid surface accuracy, with more simplicity as system.

it reduces the amount of nodes in the surface, and the overall length of folding lines.

Although the figures refer to a hexagonal configuration, it can be adapted to a different number of sides.

Other features and advantages of the present invention will become apparent from the following detailed description of an illustrative embodiment and not limiting its purpose in connection with the accompanying figures.

DETAILED DESCRIPTION OF THE INVENTION

FIGS. 1, 3, 4 and 6 show one embodiment of a deployable reflector, with its surface fully deployed. The reflector has a reflective side 1 and a non-reflective side.

Figure 5:
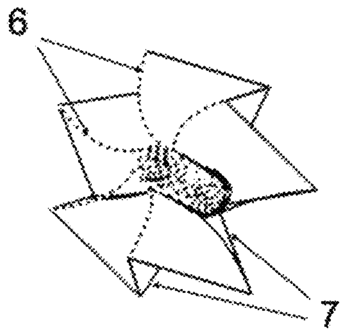
FIG. 5 shows the deployable reflector of FIG. 1 in an intermediate position.
Figure 6:
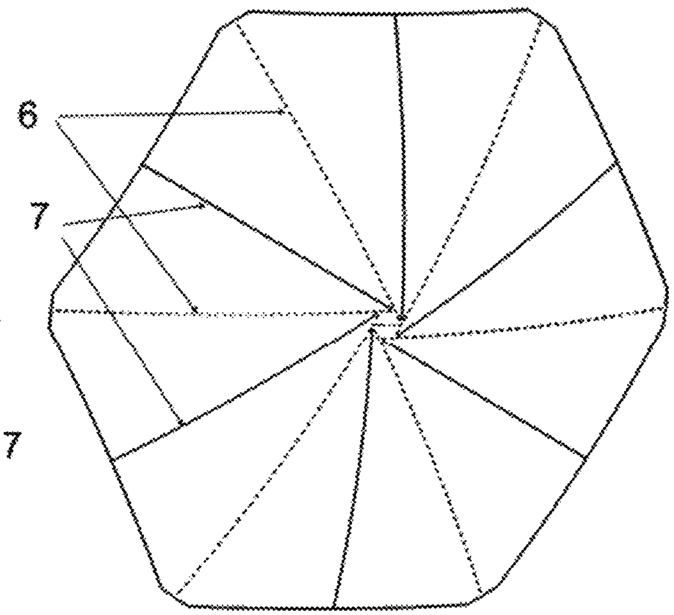
FIG. 6 shows the deployable reflector of FIG. 1 in a deployed position.
Figure 11:
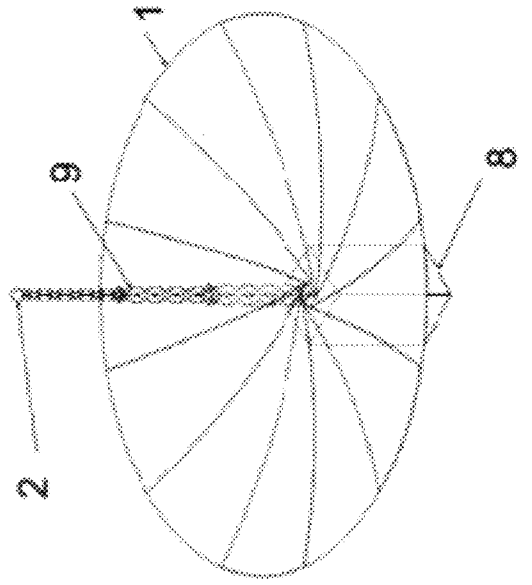
FIG. 11 shows the deployable reflector of FIG. 1 in a deployed position and with a central core.
Figure 10:
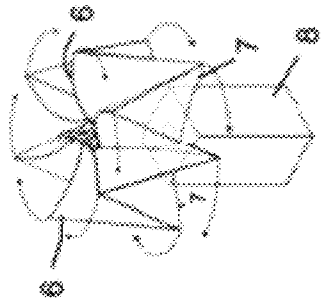
FIG. 10 shows the deployable reflector of FIG. 1 in an intermediate position and with a central core.
Figure 9:
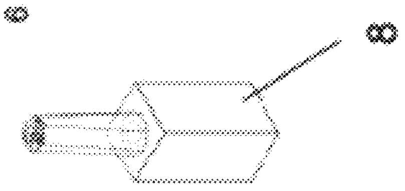
FIG. 9 shows the deployable reflector of FIG. 1 in a stowed position and with a central core.
Figure 14:
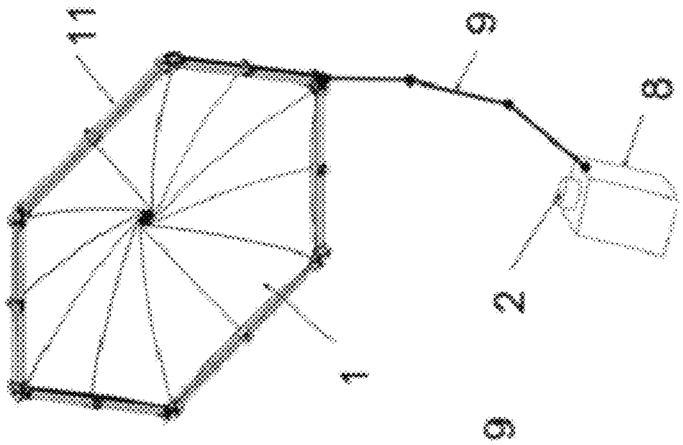
FIG. 14 shows the deployable reflector of the invention in a deployed position with an external perimeter frame.
Figure 13:
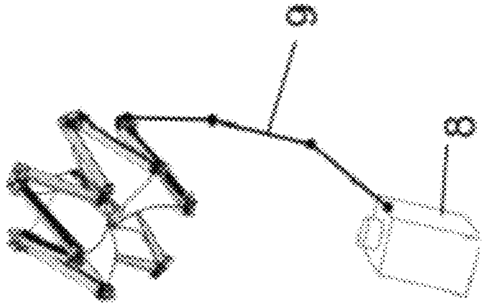
FIG. 13 shows the deployable reflector of the invention in an intermediate position with an external perimeter frame.
Figure 12:
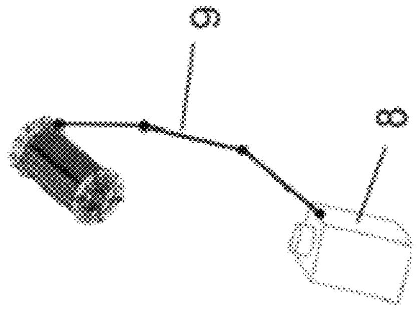
FIG. 12 shows the deployable reflector of the invention in a stowed position with an external perimeter frame.

The deployable reflector is paraboloid shaped when deployed and configured to change from a stowed position to a deployed position with intermediate positions (see, for instance the sequence of FIGS. 9 to 11, and the sequence of FIGS. 12 to 14). The intermediate positions have peaks and valleys (see FIG. 5), that correspond to peak folding lines (folds 6) and valley folding lines (folds 7) in the surface fully deployed of the deployable reflector (see FIG. 6).

Figure 1:
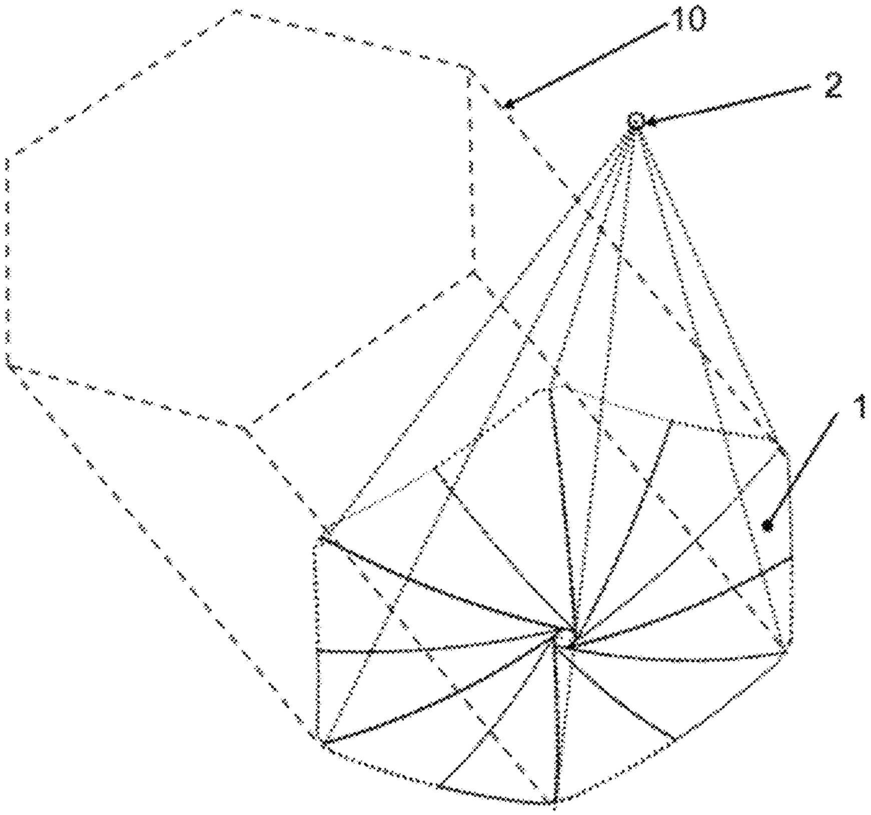
FIG. 1 shows a perspective view of a deployable reflector, with its surface fully deployed and showing its field of view.

The deployable reflector of FIG. 1 comprises the following parts:

a central polygonal part 5, in the form of an n-sided polygon (in this case, a hexagon, i.e. n=6), a set of 2n radial parts 3, 4 (12 radial parts in this embodiment) starting from the central polygonal part 5 and widening towards the periphery, so that the radial parts 3, 4 are joined by radial folds starting from the vertexes of the central polygonal part towards the periphery, the folds 6, 7 being arranged in such a way that the folds 7 which in the intermediate positions are valleys alternate with the folds 6 which in the intermediate positions are peaks, the radial parts 3, 4 having a quadratic surface when the reflector is in its deployed position, and backing elements on a non-reflective side of the radial folds 6, 7, made in a material more elastic than that of the radial parts 3, 4.

FIG. 1 shows the focal point 2 and the field of view 10 of this deployable reflector.

Figure 2:
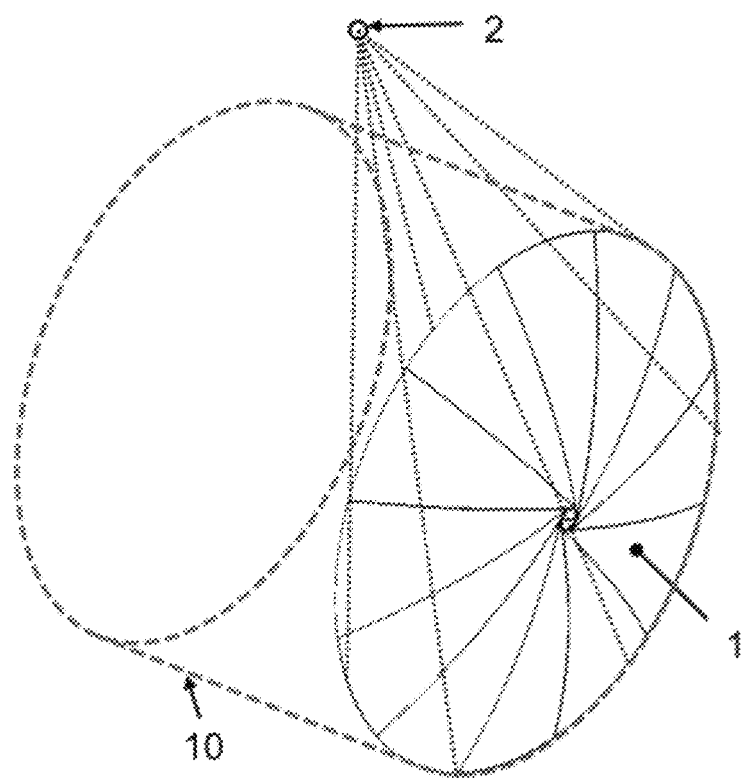
FIG. 2 shows a perspective view of a deployable reflector, with its surface fully deployed and showing its field of view.
Figure 3:
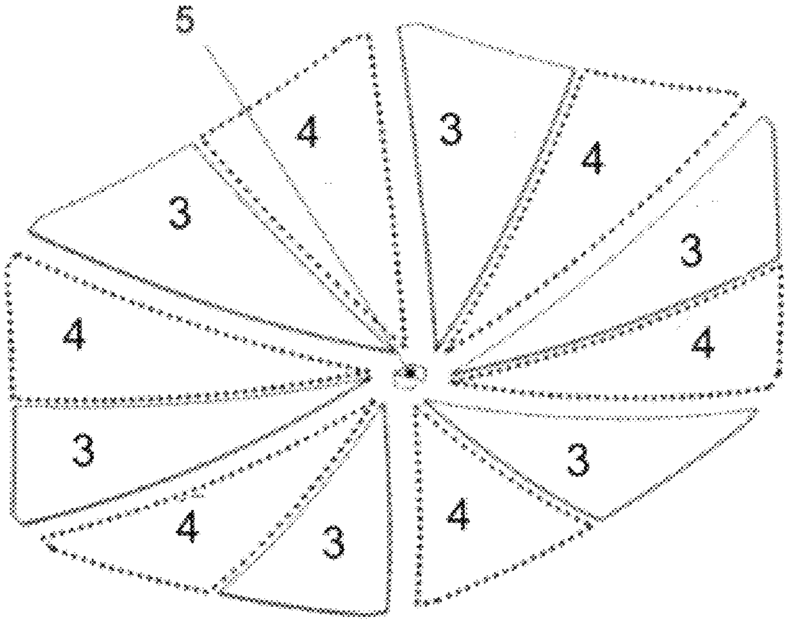
FIG. 3 shows the different elements that form the deployable reflector of FIG. 1.
Figure 4:
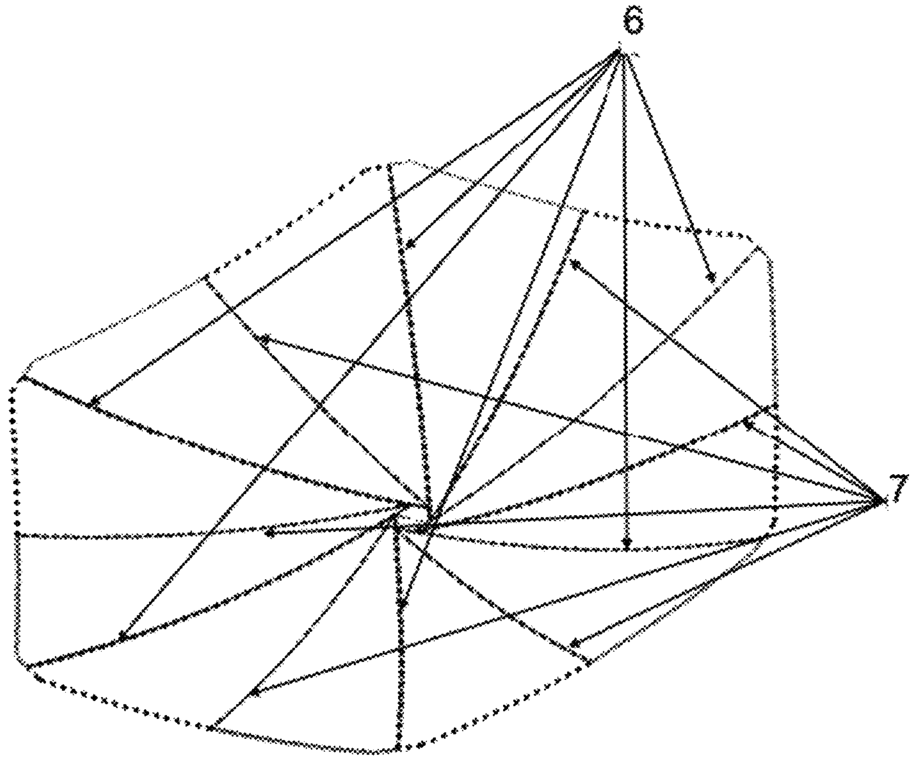
FIG. 4 shows the deployable reflector of FIG. 1 and its reflective surface.
Figure 7:
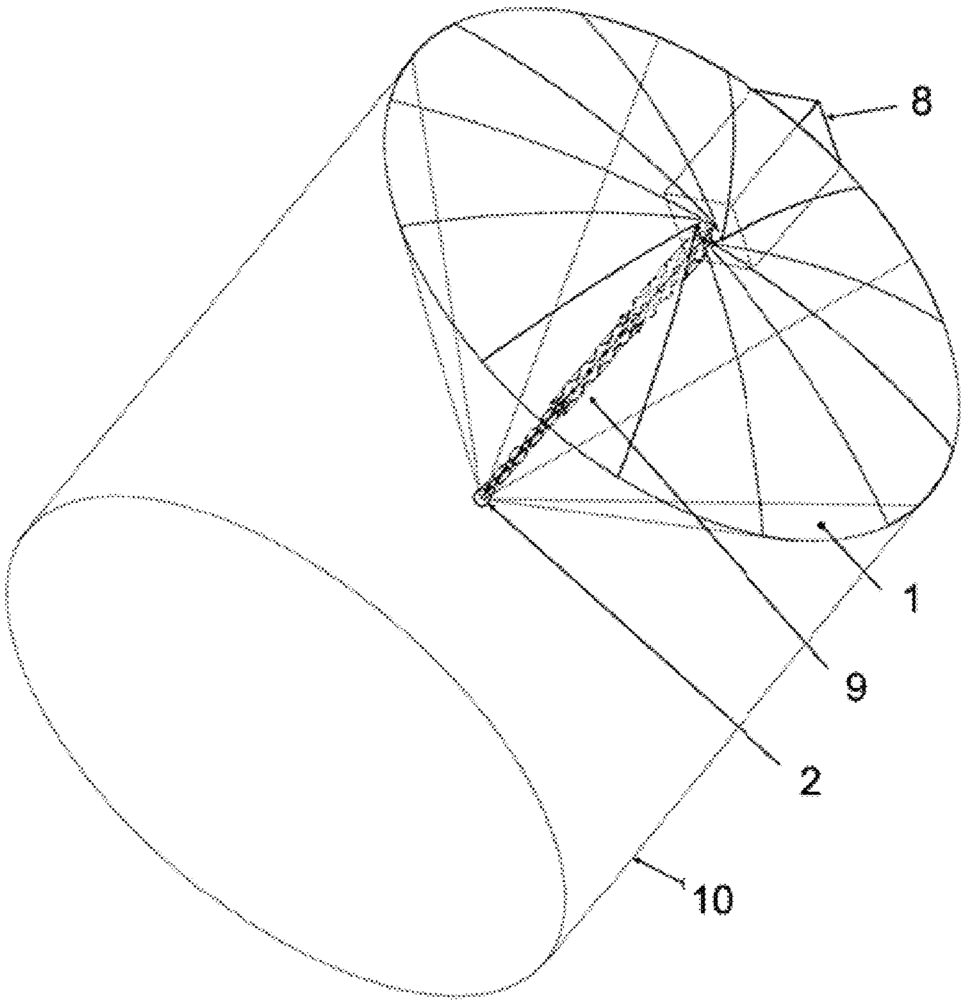
FIG. 7 shows the deployable reflector of FIG. 2 in a deployed position with a central core and showing its field of view.

FIGS. 2 and 7 show a deployable reflector in which the set of 12 radial parts has a peripheral edge in the shape of a circumference. FIG. 2 shows the focal point 2 and the field of view 10 of this deployable reflector.

Figure 8:
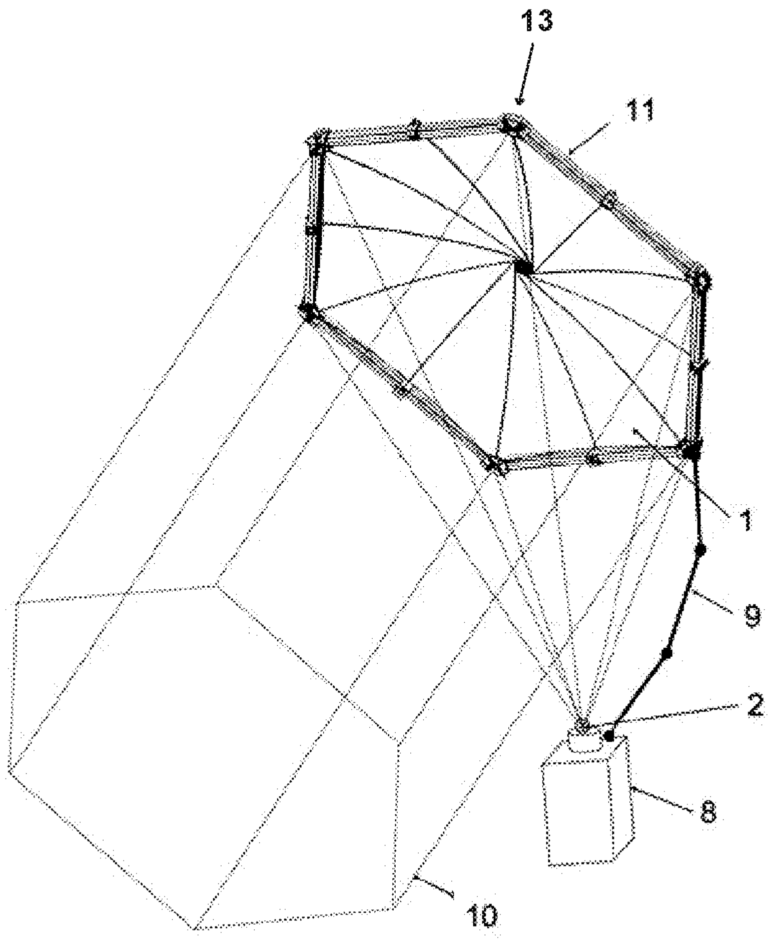
FIG. 8 shows the deployable reflector of FIG. 1 in a deployed position in a configuration with an external perimeter frame and showing its field of view.

It is to be noted that the deployable reflector of FIG. 7 has a centered focal point 2, while the deployable reflector of FIG. 8 has an offset focal point 2. The spacecraft 8 from which the reflector deploys is shown in FIG. 8 and the following ones.

The deployment process of the invention follows the Miura unfolding, regardless the fact of being quadratic radial parts 3, 4 instead of planar ones. These radial parts 3, 4 behave like flexible membranes that deploy whilst unrolling around the central polygonal part 5, as it can be seen in FIGS. 9-11 or FIGS. 12-14.

This type of unrolling of the radial parts 3, 4 can fit with two deployable reflector configurations:

with a fixed central element, around which the radial parts 3, 4 unfurl to unfold. In this case the focal antenna can be deployed with a telescopic boom 9, held by the fixed central element and accommodated inside the empty inner volume over the central polygonal part 5, when stowed (FIGS. 9-11).

inside an external perimeter frame 11, that deploys with the radial parts 3, 4 (FIGS. 12-14). The frame 11 has n sides (6, in this embodiment) attached to the sides of the peripheral edge of the set of 2n radial parts 3, 4 (12, in this embodiment) and having a hinged angular link between every two adjacent sides of the frame 11.

In the embodiment of FIGS. 12-14 there may be motors at each hinged angular link between every two adjacent sides of the frame 11.

The folding of the radial parts 3, 4 (quadratically shaped) is possible thanks to the following factors:

high elasticity of the materials of the radial parts 3, 4, capable to deform without yielding.

low thickness of these radial parts 3, 4, to minimize the stresses.

curved sections of the surface become almost straight line when submitted to the bending loads in the stowed accommodation.

The exact origami pattern depends on the thickness and number of radial parts 3, 4, as it must be conceived to allow a folded stress-free configuration. A thickness-accommodating origami pattern requires adaptation of the crease design to account for thickness of the radial parts 3, 4, giving a slight apparent curvature in some of the folding lines in the deployed pattern as result (thicker radial parts will require higher curvature in the folding lines).

The resulting radial parts 3, 4 will require a backing element in peak/valley positions (considerably more elastic than the radial parts 3, 4 of the reflector) to allow their folding together when stowed.

The design of the reflector of the invention is inspired in the Miura origami fold, but deploying a 3D design (quadratic surfaces) instead of 2D one. With this pattern, quadratic surface subdivision can be minimized attaining very compact stowed volumes that can be deployed in orbit into large reflective surfaces.

This Miura fold also simplifies the unfolding process once in orbit, as it is a single degree of freedom synchronous deployment with very few nodes, compared to other origami-inspired patterns.

Such high compaction of the sectors is possible thanks to the use of current high-elasticity composite thin radial parts 3, 4, that recover their natural quadratic shape in a stress free configuration when deployed (they are originally conformed to this shape).

When the origami is unfolded, its radial parts reach their stress-free configuration, being all the paraboloid in its minimum energy state. As a consequence, deformation on the radial parts 3, 4 will motorize the deployment until reaching a non-reversible deployed configuration.

Although the present invention has been fully described in connection with preferred embodiments, it is apparent that modifications can be made within the scope, not considering this as limited by these embodiments, but by the content of the following claims.

The invention claimed is:

1. A deployable reflector, configured to change from a stowed position to a deployed position with intermediate positions with peaks and valleys, and paraboloid shaped when deployed, wherein it comprises the following parts:

a central polygonal part, in the form of an n-sided polygon, a set of 2n radial parts starting from the central polygonal part and widening towards the periphery, so that the radial parts are joined by radial folds starting from the vertexes of the central polygonal part towards the periphery, the folds being arranged in such a way that the folds which in the intermediate positions are valleys alternate with the folds which in the intermediate positions are peaks, the radial parts having a quadratic surface when the reflector is in its deployed position, and backing elements on a non-reflective side of the radial folds in the peak/valley positions, made in a material more elastic than that of the radial parts, wherein the backing elements are configured to allow the folding of the radial parts together when stowed, wherein the set of 2n radial parts has a peripheral edge of polygonal shape with n sides, the deployable reflector additionally comprising a frame with n sides attached to the sides of the peripheral edge of the set of 2n radial parts and having a hinged angular link between every two adjacent sides of the frame.

2. The deployable reflector, according to claim 1, further comprising a fixed central element over the central polygonal part, around which the radial parts may unfurl to stow and deploy the reflector.

3. The deployable reflector, according to claim 2, wherein the fixed central element holds a telescopic boom.

4. The deployable reflector according to claim 1, further comprising motors at each hinged angular link between every two adjacent sides of the frame.

5. The deployable reflector according to claim 1, wherein the deployable reflector has an offset focal point.

* * * * *